(12) United States Patent
Montgomery

(10) Patent No.: US 8,842,263 B1
(45) Date of Patent: *Sep. 23, 2014

(54) METHOD OF, AND APPARATUS FOR, FURNISHING INFORMATION TO DETERMINE THE POSITION OF A BODY

(75) Inventor: William James Montgomery, Antrim (GB)

(73) Assignee: Short Brother PLC (IE)

( * ) Notice: Subject to any disclaimer, the term of this patent is extended or adjusted under 35 U.S.C. 154(b) by 0 days.

This patent is subject to a terminal disclaimer.

(21) Appl. No.: 06/514,036

(22) Filed: Jul. 11, 1983

(30) Foreign Application Priority Data

| Jul. 9, 1982 | (GB) | ................................. 8219395 |
| Nov. 8, 1982 | (GB) | ................................. 8231532 |
| Jun. 23, 1983 | (GB) | ................................. 8317043 |

(51) Int. Cl.
  *G01P 3/36* (2006.01)
(52) U.S. Cl.
  USPC .......................................................... 356/28
(58) Field of Classification Search
  USPC .......................................................... 356/28
  See application file for complete search history.

(56) References Cited

U.S. PATENT DOCUMENTS

| 3,813,171 | A | * | 5/1974 | Teach et al. | ................... 356/152 |
| 4,020,339 | A | * | 4/1977 | Gustafson | ................... 244/3.16 |
| 4,045,140 | A | * | 8/1977 | Bumgardner | ................ 356/152 |
| 4,178,505 | A | * | 12/1979 | Skagerlund | ................... 356/152 |
| 4,424,944 | A | * | 1/1984 | Wes et al. | ................... 244/3.13 |

FOREIGN PATENT DOCUMENTS

| GB | 0724031 | * | 2/1955 | ................... 244/3.13 |
| GB | 2633186 | * | 5/1980 | |
| GB | 2074808 | * | 11/1987 | ................... 244/3.13 |

* cited by examiner

*Primary Examiner* — Mark Hellner
(74) *Attorney, Agent, or Firm* — Venable LLP; Jeffri A. Kaminski

(57) ABSTRACT

To determine two positional co-ordinates, of a point (D) within a space, a beam (10) a radiation is caused to illuminate a part of the space and is deflected cylindrically over the space, the beam being modulated in phase with the cyclical movement such that the radiation incident upon the point (D) includes enough information to identify the point. Embodiments with rotational (r, θ) and Cartesian (x, y) co-ordinate axes are disclosed.

5 Claims, 7 Drawing Sheets

METHOD OF, AND APPARATUS FOR, FURNISHING INFORMATION TO DETERMINE THE POSITION OF A BODY

BACKGROUND OF THE INVENTION

1. Field of the Invention

This invention relates to the determination of the position of a body and more particularly, but not exclusively, is concerned with the determination of the position within a guidance beam of a moving body, e.g. missile, in order that the body may pursue a predetermined path along the beam.

2. Prior Art

British Patent Specification No. 1395246 describes a method of, and apparatus for, sensing the position of a body, the apparatus described specifically and illustrated in the specification having a reticle which shutters the beam progressively. This shuttering restricts the radiance of the transmitted beam and it is an object of the invention to ameliorate this disadvantage of the prior art system.

SUMMARY OF THE INVENTION

According to a first aspect of the present invention there is provided a method of furnishing information sufficient to determine two co-ordinates of a point position within a two-dimensional bounded space, including the steps of: (i) providing a beam of radiation so shaped as to illuminate a part only of said space; (ii) deflecting the shaped beam cyclically over the space whereby the beam is incident upon the point during discrete, spaced periods of time; and (iii) so modulating the beam in phase with the said cyclical movement that the radiation incident on the point position provides at the point sufficient information to identify both of the two co-ordinates.

With such a method, the point position relative to a longitudinal axis of the beam may be determined by providing at said point position a radiation sensor and comparing the radiation sensed by the sensor with the form of modulation of the beam. This computation of position can be on a body carrying the sensor or remote from any such body.

By channeling the energy of the beam into a useful shape, and transmitting the energy within the shape, instead of shuttering a beam wide enough to illuminate the whole of the said bounded space, the radiance of the transmitted beam, from a radiation source of given power, is significantly increased. For example, defining a shape with an area one ninth that of the bounded space will increase the radiance by a factor of nine. Setting aside atmospheric factors, this would increase the useful range of the beam by a very valuable factor of three.

According to a second aspect of the present invention there is provided apparatus for furnishing information sufficient to determine two co-ordinates of a point position within a two-dimensional bounded space, and comprising means to generate a beam of radiation shaped to illuminate a part only of the space, means to deflect the beam cyclically over the space whereby the beam is incident upon the said point position during discrete spaced periods of time, and means so to modulate the beam in phase with the said cyclical movement that the radiation incident on the point position provides at the point sufficient information to identify both of the two co-ordinates.

In one embodiment the apparatus comprises means for generating a shaped, pulsed laser beam and means (e.g. a Pechan prism) for rotating it around an axis. The pulse frequency is high enough to provide a multitude of pulses in each revolution of the beam. The shape may be chosen such that the duration of illumination of any point in a bounded space illuminated by the beam is indicative of the radial distance r of the point from the axis, while the frequency of repetition pulses varies cyclically, in phase with the rotation of the beam, so that the repetition frequency of pulses received during each period of illumination is indicative of the angular displacement $\theta$ of the point from a reference axis.

It will be appreciated that, in this last-mentioned arrangement, sufficient information is provided in each illumination period to identify both co-ordinates of the point. In prior Specification No. 1395246, a set of two consecutive periods is needed, to convey this amount of information. Nevertheless, the present invention is not restricted to arrangements in which a single period provides, by itself, fully comprehensive positional data.

The method of the invention preferably includes the steps of (i) providing a beam of radiation comprising a first beam component and a second beam component, each said component being so shaped as to illuminate a part only of said space, (ii) repeatedly scanning the first beam component across the space in a first scanning direction at a first scanning frequency, (iii) repeatedly scanning the second beam component across the space in a second scanning direction inclined to the first scanning direction and at a second scanning frequency, and (iv) so modulating the first beam component in phase with the first scanning frequency and so modulating the second beam component in phase with the second scanning frequency that the beam radiation incident on the point position from the first and second beam components provides at the point sufficient information to identify both of the two co-ordinates.

Conveniently, the first and second scanning directions are mutually perpendicular and the first and second scanning frequencies are equal, with the first and second beam components scanning alternately in time across the bounded space.

The apparatus of the invention preferably comprises means to generate a beam of radiation comprising a first beam component and a second beam component, each said component being so shaped as to illuminate a part only of the space, means for repeatedly scanning the first beam component across the space in a first scanning direction at a first scanning frequency, means for repeatedly scanning the second beam component across the space in a second scanning direction inclined to the first scanning direction and at a second scanning frequency, and means for so modulating the first beam component in phase with the first scanning frequency and so modulating the second beam component in phase with the second scanning frequency that the beam radiation incident on the point position from the first and second beam components provides at the point sufficient information to identify both of the co-ordinates.

Conveniently the apparatus comprises means for generating first and second shaped, pulsed laser beam components and means for sweeping them across the space in first and second scanning directions respectively. The pulse frequency of each component is high enough to provide a multitude of pulses in each scan of that beam component across the space. In one embodiment, the frequency of pulses of each component varies in phase with the sweep of the beam component, so that the frequency of pulses received during each period of illumination is indicative of the displacement in predetermined X and Y directions.

Apparatus in accordance with the invention may be used in conjunction with a radiation sensor to be secured to a body, and position computing means, either on the body or remote from it, which in use receives as input information as to the radiation incident upon the sensor.

The invention has particular application to remote guidance of a body (e.g. a guided-missile) moving along a laser guidance beam. According to the invention, therefore, there is also provided, in combination, a body to be remotely guided along a pulsed modulated guidance beam and comprising a radiation sensor and position computing means programmable with information about the modulation of the beam sufficient for computation of the position of the body within the cross-section of the beam relative to a longitudinal axis of the beam by inspection of an output from the radiator sensor, and means for generating said modulated beam, including means for moving the beam cyclically over a bounded space and means for modulating the beam in phase with the said cyclical movement.

Although the invention is applicable to any moving body whether it be on land, in/or on the sea, in the air or outer space, it is particularly suited to moving bodies such as missiles which incorporate means for modifying the trajectory of the body. It can also be applied to moving bodies which do not possess such means but which are required to receive, at any moment, data concerning the position of the moving body with respect to a given trajectory or sight line. The invention may be applied to moving bodies whose orientation in space is required to be determined at a fixed or moving point away from the moving body.

The invention has particular application to a missile guidance system in which a laser beam control pattern is directed at a target and a missile fired into the beam pattern. The missile carries on its rear end a sensor which is operative to sense a spatially modulated laser beam and feed signals in response thereto to a control device within the missile which produces signals dependent on the position of the missile in the cross-section of the control pattern. Once this position has been calculated the missile is controlled to move towards the centre or other designated position within the control pattern. By tracking the target with the control pattern, the missile is guided to the target.

BRIEF DESCRIPTION OF THE DRAWINGS

Reference will now be made, by way of example, to the accompanying drawings, in which.

DETAILED DESCRIPTION

Figure 1:
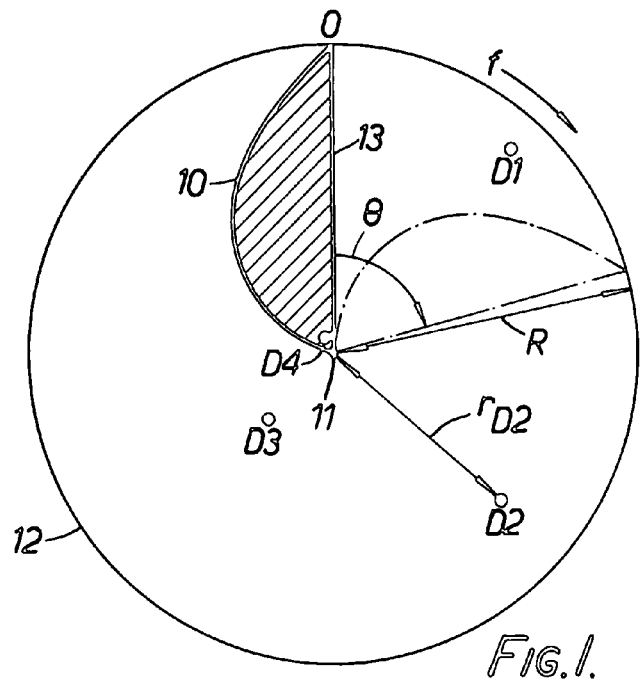
FIG. 1 is a diagram of a first control beam shape in cross-section showing the meaning of parameters r, R and θ and identifying four points D within the beam cross-section.

With reference to FIGS. 1 to 7 of the drawings, and in particular FIG. 1, spatial modulation of a control beam cross-section 10 is achieved by (1) rotating a laser beam in a direction f about the central axis 11 of a circular control pattern area 12 having radius R, (2) pulsing the laser beam at a frequency which varies with its angular displacement (e.g. θ after time t) from a vertical or other reference direction 13 in the plane of the control pattern. Each revolution of the laser beam takes time T. During it, the pulse repetition frequency (or pulse interval) is varied between two limits, and the cycle is continually repeated at a pre-determined rate. Measurement by a sensor D of the time interval $T_\theta$ between received laser pulses provides a measure of the position of the sensor in terms of an angular displacement 9 from the reference direction 13, and (3) so shaping the control beam that the total time Tr during which a sensor receives electromagnetic waves per revolution of the beam pattern provides a measure of the position of the sensor in terms of a radial displacement r from the axis of rotation 11 of the beam.

FIGS. 1 to 4 illustrate the simple case of a beam so shaped that during rotation thereof at a steady angular velocity w, the proportion Tr of the total time T for one revolution of the beam during which laser radiation is incident upon a point varies strictly linearly with the radial distance r of that point from the rotational axis 11 of the beam 10, and varies from 25% for a point just off the axis of the beam to 0% for a point on the very edge of the beam. This has been termed a "rotating leaf" beam modulation system.

Figure 2:
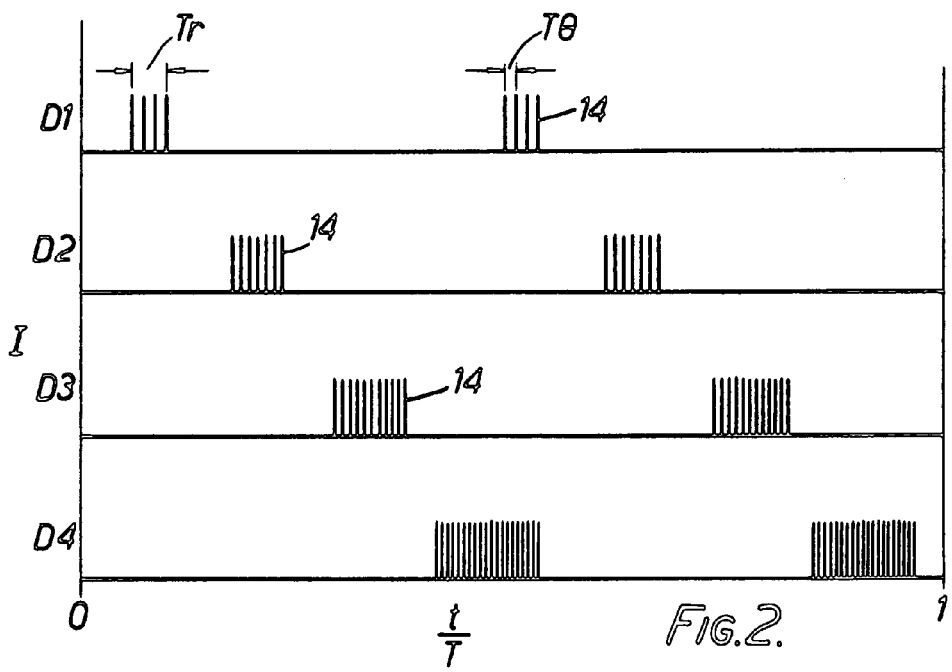
FIG. 2 is a graph of received beam intensity I against time, expressed as one cycle of revolution of the beam around the axis 11, for the four points shown in FIG. 1 the graph indicating the form of the beam as it is incident upon each of the four points D.

FIGS. 1 and 2 illustrate schematically the variation in a series of electromagnetic (laser) pulses 14 received for various sensor positions (D1, D2, D3 and D4) within the area 12 controlled by the beam 10.

Figure 3:
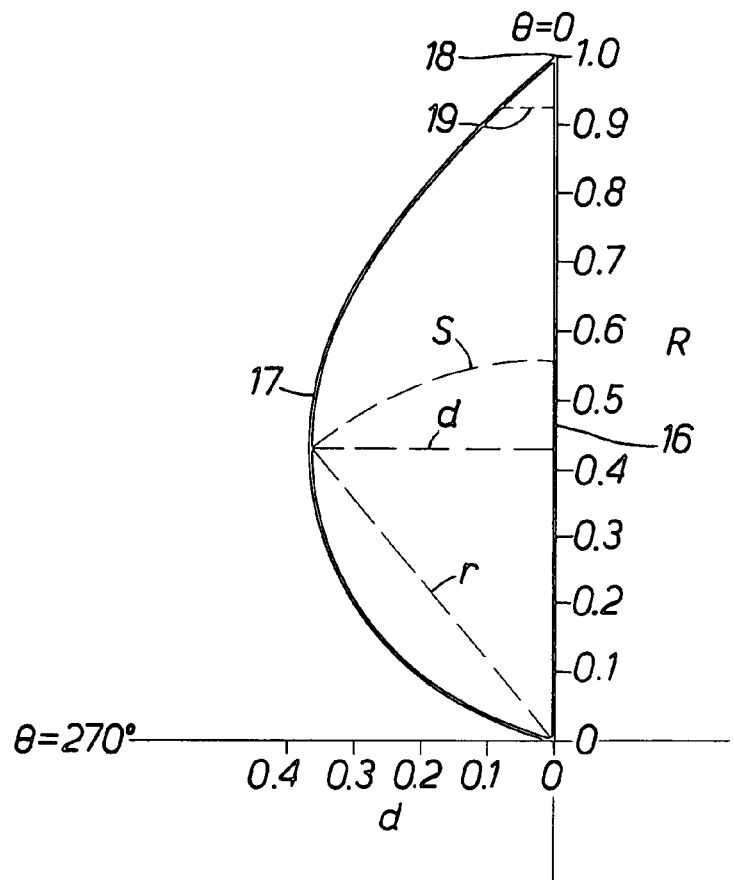
FIGS. 3 and 4 are graphs which further characterize the form of the beam section shown in FIGS. 1 and 2.
Figure 4:
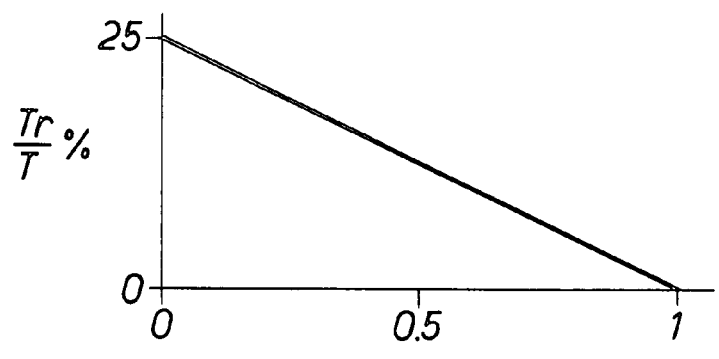
Figure 5:
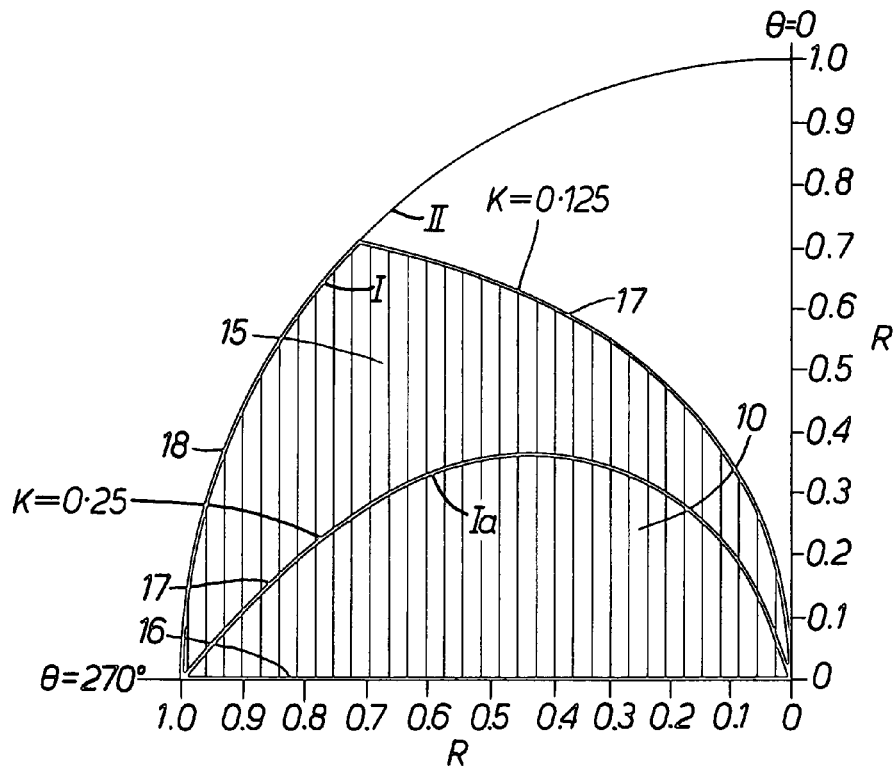
FIG. 5 is a graph similar to FIG. 3 showing a second shape of a beam section.

Referring to FIGS. 3, 4 and 5, a range of beam shapes governed by the expression $$d = r \cos [2\pi Kr]$$

possess the characteristic that the time Tr during which electromagnetic waves are received by a sensor D decreases linearly with increasing radial co-ordinate r. These shapes are identified herein as Shape I.

With K=0.125 the second curve illustrated in FIG. 5 is generated. However, other values of K within the range 0-0.25 could be chosen, these curves all providing a linear change (with radial position) of the time during which electromagnetic waves are received by the sensor.

An alternative range of shapes (Shape II) may be generated, and these are characterizes in that the time during which electromagnetic waves are received by the sensor D increases with increasing radial co-ordinate r. These shapes correspond to those generated when the first set Shape I are subtracted from a quadrant of a circle to yield, for example, the unshaded area in FIG. 5.

Figure 6:
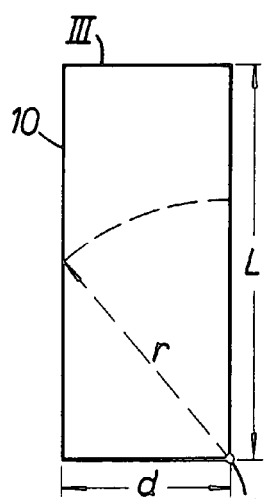
FIG. 6 is a graph showing a third shape and FIG. 7 is a graph which characterizes the form of that beam section.
Figure 7:
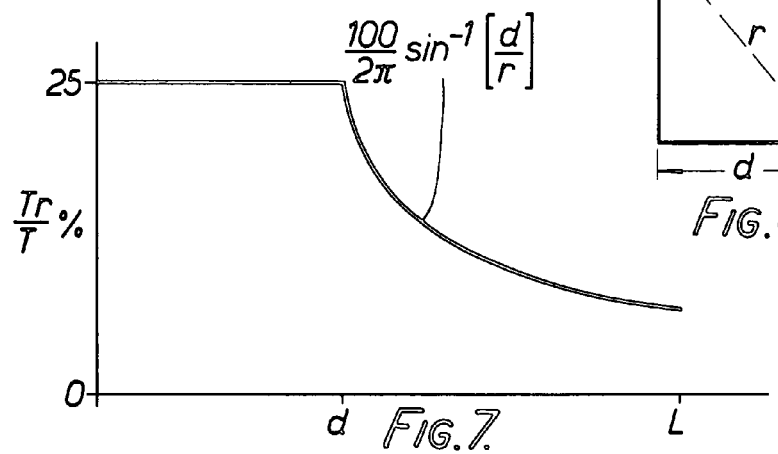

A third set of shapes (Shape III) may be generated by the rotation of a beam of rectangular cross-section about one corner of the rectangle. FIG. 6 illustrates the beam shape and the variation of time of receipt of electromagnetic radiation with radial co-ordinate r. It will be seen from FIG. 7 that in a circular region radius d around the centre 11 of the pattern no precise radial co-ordinate information is available though angular information may be derived from the pulse interval $T_\theta$ in the same way as the first and second sets of shapes. Outside this central region the detector will receive both radial and angular co-ordinate information. The relative size of the central region is determined by the width/length ratio d/L of the rectangular shape. Various d/L ratios may be considered for example ratios from 1 to 0.067 and below may be easily employed in practical beamriding transmitters.

The use of a rectangular beam has the advantage of simple beam shaping (with particular laser sources). This system would be useful in special beamriding systems wherein the body being guided is required to either remain in the general region (x<d) around the center of the control pattern and/or be guided to precise points outside this central region x>d.

Although a multitude of rotating beam shapes are suitable for position definition these three particular shapes are of special significance in missile beamriding systems because of factors such as the ease of generation of particular shapes of beams of electromagnetic waves or the linearity of the sensor response to the modulated radiation received.

Of the three types already identified, Shape I has the most general application to missile beamriding systems, while Shapes II and III may find application in particular situations.

Referring again to FIG. 3, it will be seen that the beam shape comprises a straight radial edge 16 which, when θ=0 is co-incident with the reference direction 13, a curved edge 17 and a short circumferential edge 18 extending in a circumferential direction to complete the shape but which is, in the FIG. 3 limiting case, of zero length. The beam generated by an aperture or other means may be arranged to rotate in either direction by the beam rotation system.

The nature of the curved edge 17 and the relative length of the short circumferential edge 18 may be varied to mould the linearity of the radial information provided to the missile guidance system. In this first example, Shape Ia, Tr decreases linearly with increasing radial co-ordinate value r, in accordance with the expression:

$$d = r \cos\left[\frac{\pi}{2}r\right]$$

where d and r are defined in FIG. 3.

The shape may be chosen such that the length of the circumferential edge 18 is finite thereby ensuring that the receipt time of electromagnetic radiation by the sensor does not approach zero at the edge R of the controlled space 12. The following are examples of ways which may be used to achieve this:—

(1) A simple removal of the aperture tip illustrated by the dashed circumferential edge 19 in FIG. 3.
(2) Design of a curved edge which satisfies a general expression of which equation (1) is a particular example.

The resolution of the detecting apparatus for beam shapes I and II in both the angular and radial directions varies with the angular coordinate.

With beam shape III, the resolution of the detecting apparatus in both angular and radial directions again vary with the angular position from the reference angle. See the specification of British Patent Application No. 8219395 from which this description derives.

Figure 8:
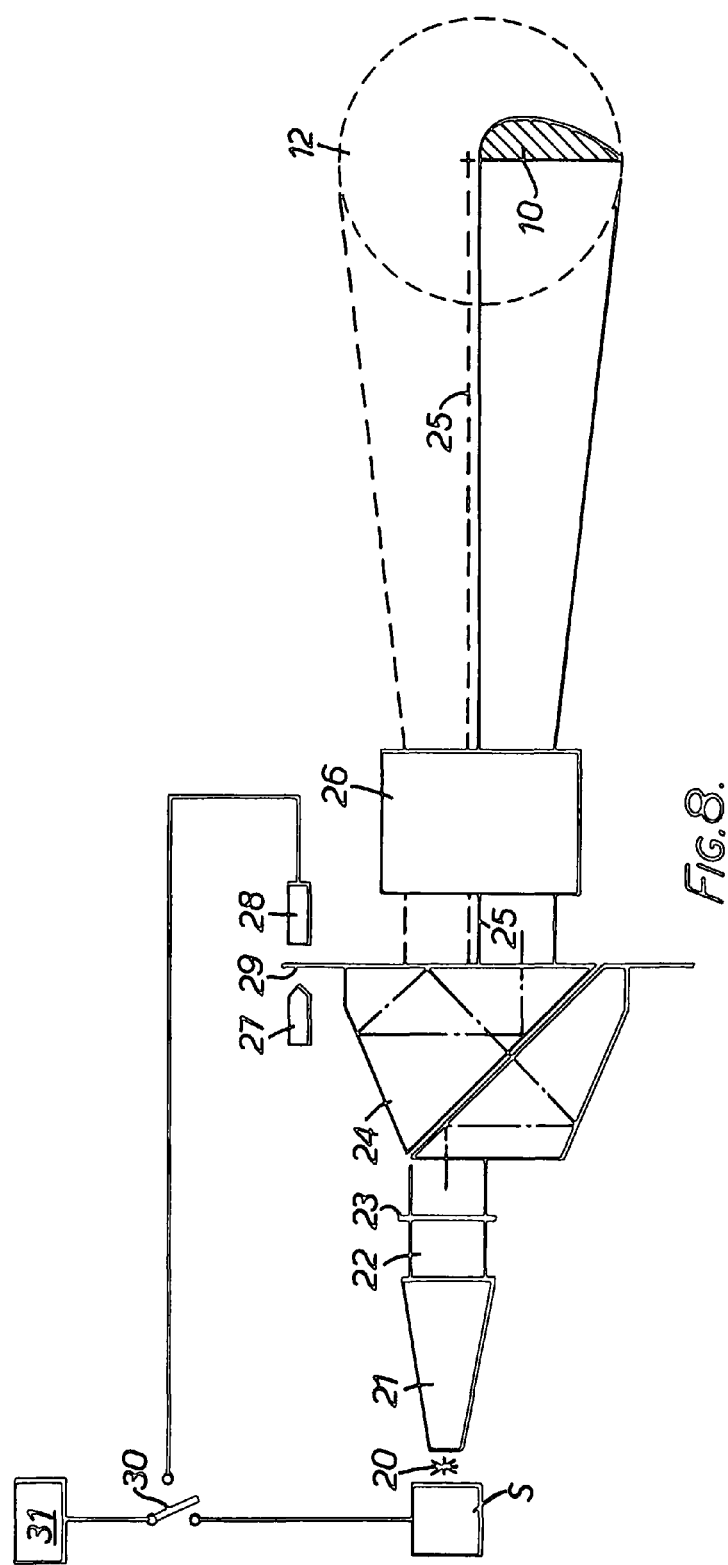
FIG. 8 is a view from one side of apparatus according to the invention for generating a beam having a section as shown in FIGS. 1, 2, 3 and 4.

Referring to FIG. 8 the illustrated embodiment of optical beam transmitting apparatus comprises a divergent laser source S providing a laser beam 20 which is collimated by a fibre optic integrating system 21.

Alternatively the diverging beam can be collimated by a collimating lens, the collimated beam being partially diffused by a diffusing plate or optical scrambler rod.

The resultant substantially parallel beam 22 is then passed through a fixed shaped aperture 23 which is provided in a housing (not shown) which has an interior matt black finish. The shape of the aperture 23 corresponds to the shape of the transmitted laser beam 20.

Arranged in front of the fixed aperture 23 is a beam rotation optical system 24 (in this case a pechan prism) which is driven by a motor (not shown) so as to rotate the shaped beam normally at a constant angular velocity on an axis 25 passing through the center of the beam rotation optical system and one end of the aperture. The beam then passes to a main optical system indicated by a zoom lens 26 which focuses the laser beam as required. The lens is of the "flick on" type, in that it features step changes in optical gain to match what would be for the maximum and minimum optical gain of a normal zoom lens.

A laser trigger mechanism linked to the beam rotation system pulses the laser as the beam is rotated. The laser trigger consists of a light source 27 and light sensor 28. The light transmitted by the source 27 is modulated by a pulsing pattern comprising alternate opaque and transparent regions provided around the periphery of a reticle 29 mounted to the beam rotation system. The sensor produces, in response to the pulsed light signals, a pulsed output signal which triggers a solid state switch 30 to intermittently connect a source 31 of high power to the laser source to produce corresponding pulses of the laser beam. A progressive increase or decrease in the width of the opaque areas around the circumference of the reticle will produce during each rotation an increase or decrease in the time interval between pulses of the laser beam within an upper and lower limit.

Figure 9:
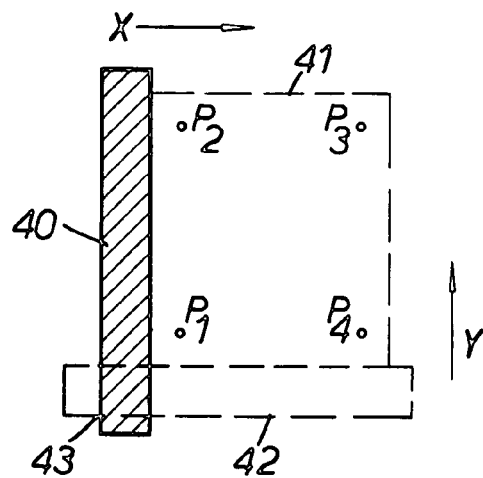
FIG. 9 is a diagram of a control beam in cross-section showing the meanings of parameters X and Y and identifying four points within the beam cross-section.

With reference to FIGS. 9 to 12 of the drawings and in particular FIG. 9, spatial modulation of the control pattern cross-section is achieved by (1) sweeping a first beam component 40 across a rectangular control pattern area 41 in a first scanning direction X and at a first scanning frequency (No. of scans in unit time), (2) sweeping a second beam component 42 across the same control pattern area 41 in a second scanning direction Y which is perpendicular to direction X and at the same scanning frequency, the scans of the second beam component 42 being arranged to illuminate points within the control pattern area 41 at times which alternate with the times of illumination of the point by the first beam component 40, and (3) pulsing each beam component at a frequency which varies with its displacement (x or y) from the origin 43 of the X, Y scanning axes in the plane of the control pattern. During each sweep of a beam component, the pulse repetition frequency (or pulse interval) is varied between two limits, with alternate sweeps preferably possessing different limits and non-overlapping ranges, and the two sweep cycles being continually repeated at a predetermined rate.

A sensor is actuated by laser radiation of the pulse train of each sweep of a beam component. Measurement by the sensor of the time intervals (Tx, Ty) between received laser pulses in two consecutive pulse trains provides a measure of the position of the sensor relative to mutually perpendicular reference axes.

Figure 10:
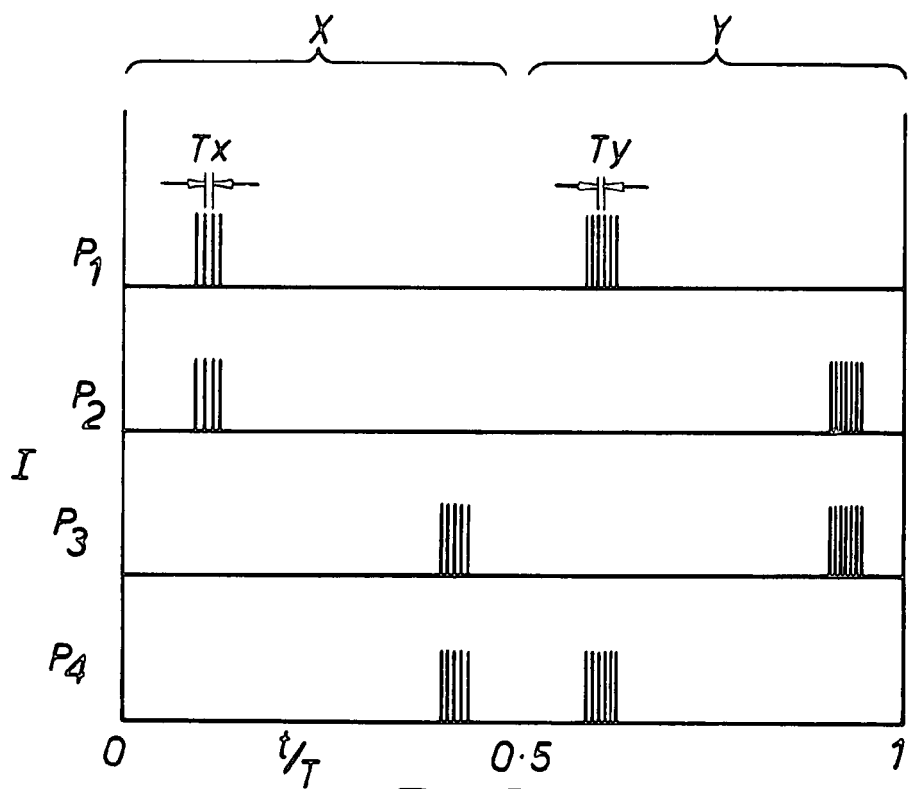
FIG. 10 is a graph of received beam intensity I against time expressed as one scan cycle of the two beam components, for the four points shown in FIG. 9, the graph indicating the form of the beam as it is incident upon each of the four points P.

FIG. 10 illustrates schematically the variation in a series of electromagnetic (laser) pulses received for various sensor positions ($P_1$, $P_2$, $P_3$, $P_4$) within the control beam.

Figure 11:
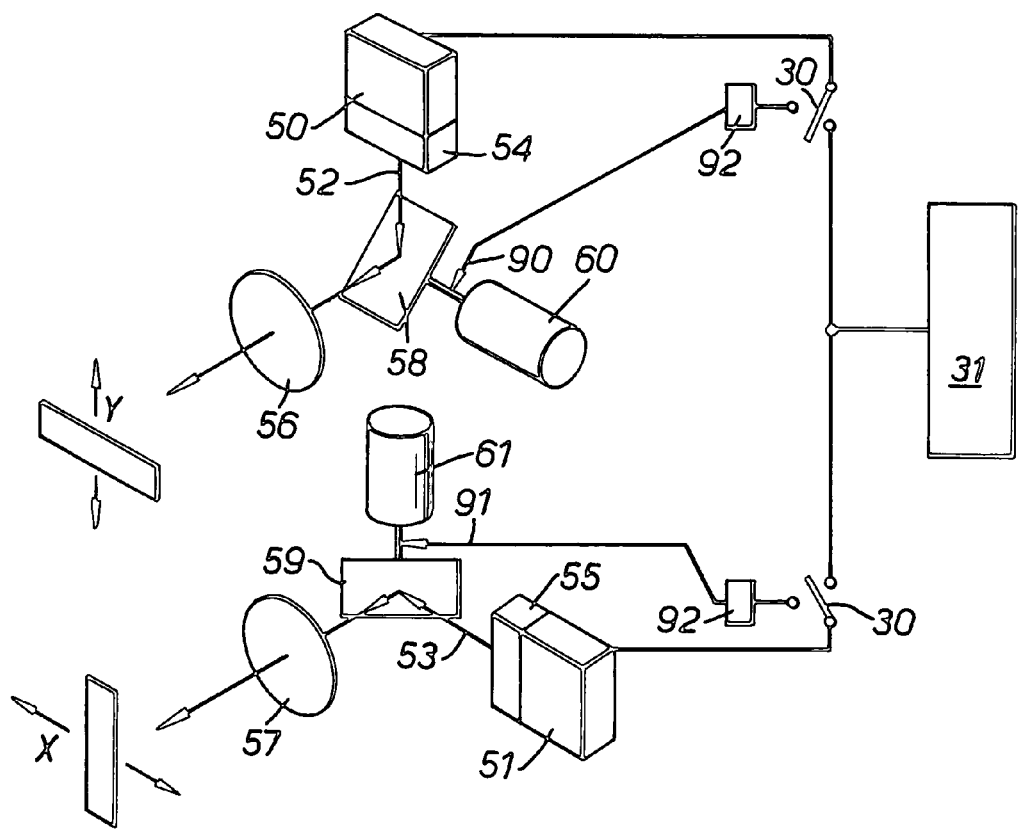
FIG. 11 is a diagram of an optical arrangement of double source/double scanner/double aperture beamriding transmitter, being a first embodiment of apparatus according to the invention for generating the beam of FIG. 9.
Figure 12:
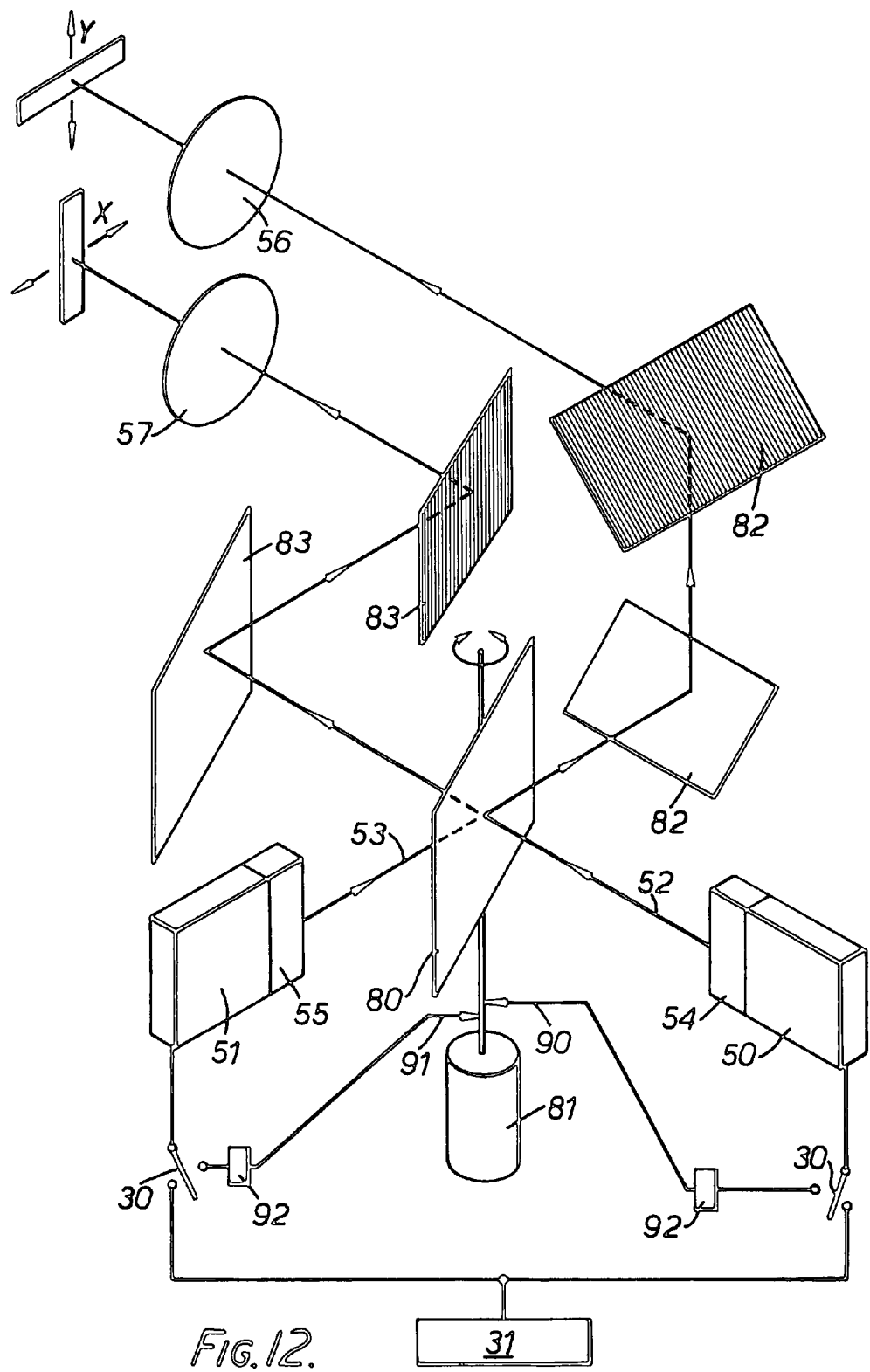
FIG. 12 is a diagram of an optical arrangement of a double source/single scanner/double aperture beamriding transmitter, being a second embodiment of apparatus according to the invention for generating the beam of FIG. 9.

Generation of the control pattern by alternate sweeps of a rectangular shaped beam in orthogonal directions may be achieved by a variety of optical systems, for example, a single or double scanner, a single or double source and a single or double lens (i.e. aperture). FIGS. 11 and 12 respectively illustrate two optical arrangements selected from the range of possible scanner/source/lens combinations.

The choice of arrangement for a particular application will be governed by overall system design considerations. See the discussion in British Patent Application No. 8231532 from which this description derives.

Referring to FIG. 11, the illustrated embodiment of optical beam transmitting apparatus comprises a first 50 and a second 51 divergent laser source (for example laser diodes) providing first 52 and second 53 laser beams which are coupled into first 54 and second 55 fibre optic elements possessing rectangular cross-section output faces. The divergent beams from the shaped rectangular sources then pass to a main optical system indicated by first 56 and second 57 lenses which focus the beams as required.

Alternatively (1) the diverging beams from the laser sources can be collimated by collimating lens systems, the collimated beams being partially diffused by diffusing plates or optical scrambler rods. The resultant substantially parallel beams are then passed through fixed rectangular shaped apertures to the main optical system or (2) the diverging beams can be both collimated and shaped by double cylindrical lens systems within the main optical system.

Arranged between the rectangular shaped sources 54 and 55 and the main optical system 56 and 57 or alternatively after the main focussing lenses 56 and 57 are first 58 and second 59 scanning mirrors which are driven by first 60 and second 61 torque or other motor so as to sweep the beam usually at a constant angular velocity alternatively in orthogonal directions about the control region.

FIG. 12 shows a modification in which a single, double sided, scanning mirror 80 replaces the two scanning mirrors 58 and 59, being driven by a single motor 81. After reflection at the mirror 80, the beam 52 is directed to the lens system 56 by a pair of mirrors 82, and the beam 53 by mirrors 83.

Laser trigger mechanisms linked to the beam scanning systems pulse the appropriate laser as the beam is scanned. Each laser trigger consists of a 'pick-off' or sensor 90,91 which senses the position of the scanning mirror and feeds information thereon to a control device 92 which produces a pulsed output signal to trigger a solid state switch 30, in phase with the scanning mirror positions, intermittently connecting a source 31 of high power to the laser source to produce corresponding pulses of the laser beam. During each scan of the mirrors each control device 92 will produce a progressive increase or decrease in the time interval between pulses of the laser beam within upper and lower limits.

Alternative Apparatus is possible, for example:

A continuous wave laser (or a non-lasing pulsed or continuous source) may be used instead of a laser pulsed at source. The output from a continuous wave laser could be pulsed i.e. its intensity modulated before or after beam shaping using for example:

(a) Mechanical shutters for example a rotating reticle comprising alternate transparent and opaque sectors, in which the width of the opaque sectors increases or decreases around the reticle. In FIGS. 11 and 12 the scanning mirrors are driven appropriately in phase with the beam shuttering.

(b) Electro-optic, acousto-optic or other shutter triggered from the beam rotation system or main control device.

(c) Direct laser cavity (Length) modulation inducing wavelength modulation (and received intensity modulation) by end mirror displacement using piezoelectric elements.

Alternative trigger mechanisms may be considered. These may be triggered directly from the beam scan by electromechanical or electro-optic means or from the beam by electro-optic means for example:—

(a) Electronic pulse interval variation using an electronic ramp triggered pulse per beam scan from a light source/reticle/light sensor system.

(b) Monitoring the generated beam position (i.e. direction by means of a quadrant detector or other optical position sensitive device.

Furthermore r and θ, or x and y positional information could be provided by changing a different characteristic of the beam other than the time interval between pulses of electromagnetic radiation for example:

(i) The wavelength (colour) of the beam may be varied as the beam is scanned across the control region, by means of a tunable laser source or optical filter.

(ii) The intensity may be varied using a variable density optical filter or variable input laser drive power.

(iii) The axis of polarization of a linearly polarised laser beam may be varied as the beam is scanned across the control region (e.g. the axis may be varied by 180° as the beam is rotated by 360°) and a polarization, sensitive detector(s) mounted on the moving body.

The invention claimed is:

1. Apparatus for furnishing information sufficient to determine two polor co-ordinated (r, θ) of a point position within a two dimensional bounded space, said polar coordinates measured with respect to a center of said space and a reference angle with said space, comprising:
   means for generating a beam of radiation, and for shaping said beam to illuminate a part only of the space, said part extending from the center to the circumference of the shape, said part including an edge defined by the following equation:

$d = r \cos[2\pi Kr]$ where d is a distance between said edge and said reference angle when said part is positioned at a reference position corresponding to said reference angle, K is a constant falling within the range of $0 < K \leq$ substantially 0.25, and r is normalized to unit radius,
   means for revolving the beam around the center of the space whereby the beam is incident upon the said point position during discrete spaced periods of time, a duration of said periods of time defining said r coordinate, and
   means for modulating the beam in phase with the revolution of the beam thereby to define said θ co-ordinate.

2. Apparatus as claimed in claim 1 wherein the modulating means comprising means for pulsing the beam with a frequency which varies in phase with the revolution of the beam.

3. Apparatus as claimed in claim 1 wherein the beam generating means comprises a laser source coupled to a fibre optic transmission element with an output face of a shape which corresponds to the required shape of the generated beam or beam component.

4. Apparatus as claimed in claim 1 wherein the means for revolving the beam comprises a pechan prism and means to rotate the prism about an axis which contains the center of the bounded space.

5. Apparatus according to claim 1 wherein K is substantially equal to 0.25.

* * * * *